United States Patent [19]

Leen et al.

[11] Patent Number: 4,708,857

[45] Date of Patent: Nov. 24, 1987

[54] PROCESS FOR PREPARING A CRYSTALLINE IRON-BOROSILICATE

[75] Inventors: Kee K. L. S. Leen, Ottawa; Jin R. Chang, Ste-Foy, both of Canada

[73] Assignee: Centre de Recherche Industrielle du Quebec, Quebec, Canada

[21] Appl. No.: 910,305

[22] Filed: Sep. 22, 1986

Related U.S. Application Data

[63] Continuation of Ser. No. 517,396, Jul. 26, 1983, abandoned.

[51] Int. Cl.$^4$ ............................................. C01B 35/10
[52] U.S. Cl. .................................... 423/277; 423/326; 423/328; 423/329; 502/60; 502/66; 502/77; 502/202
[58] Field of Search .............. 423/326, 277, 328, 329; 502/77, 202

[56] References Cited

U.S. PATENT DOCUMENTS

| | | | |
|---|---|---|---|
| 3,941,871 | 3/1976 | Dwyer et al. | 423/326 |
| 4,208,305 | 6/1980 | Kouwenhoven et al. | 423/326 X |
| 4,269,813 | 5/1981 | Klotz | 423/277 |
| 4,388,285 | 6/1983 | Rankel et al. | 423/329 |
| 4,410,501 | 10/1983 | Taramasso et al. | 423/326 |
| 4,420,467 | 12/1983 | Whittam | 423/328 |
| 4,462,971 | 7/1984 | Hinnenkamp et al. | 423/277 |
| 4,519,998 | 5/1985 | Leen | 423/277 |
| 4,521,297 | 6/1985 | Angevine et al. | 208/89 |
| 4,551,321 | 11/1985 | Marosi et al. | 423/329 |
| 4,567,310 | 1/1986 | Rodewald | 502/74 |
| 4,576,805 | 3/1986 | Chang et al. | 502/202 |
| 4,623,526 | 11/1986 | Leen | 423/277 |

FOREIGN PATENT DOCUMENTS

| | | | |
|---|---|---|---|
| 1142905 | 3/1983 | Canada | 423/328 |
| 2831611 | 2/1980 | Fed. Rep. of Germany | 423/326 |
| 2024790 | 1/1980 | United Kingdom | 423/326 |
| 2077709 | 12/1981 | United Kingdom | 423/329 |

OTHER PUBLICATIONS

R. Szostak, "Preparation of Ferrisilicate ZSM-5 Molecular Sieves", *J. of Catalysis*, 100, 555–557, (1986).

*Primary Examiner*—John Doll
*Assistant Examiner*—Jackson Leeds
*Attorney, Agent, or Firm*—Cushman, Darby & Cushman

[57] ABSTRACT

A crystalline ironborosilicate comprises a molecular sieve material having the following composition in terms of mole ratios of oxides $$1.0 \pm 0.3\ M_{n/2}O: (a\ Fe_2O_3:b\ B_2O_3):y\ SiO_2.z\ H_2O$$

wherein M is at least one cation having a valence n, a is greater than zero but less than 1, b is greater than zero but less than 1 such that $a+b=1$, y is a value of at least 6, and z is a value within the range of 0 to about 500 and giving a specific X-Ray diffraction pattern. The crystalline ironborosilicate is used to catalyze various processes such as the conversion of simple alcohols to high-octane gasoline, and the catalytic hydrogenation of carbon monoxide for the production of high-octane liquid hydrocarbons. The preparation of the ironborosilicate is also disclosed.

4 Claims, No Drawings

PROCESS FOR PREPARING A CRYSTALLINE IRON-BOROSILICATE

This is a continuation of application Ser. No. 517,396, filed July 26, 1983 now abandoned.

BACKGROUND OF THE INVENTION (a) Field of the Invention

This invention is concerned with novel crystalline ironborosilicates and their uses in the production of high-octane liquid hydrocarbons. More particularly, it relates to novel crystalline ironborosilicate zeolitic materials possessing catalytic properties and to conversion processes using such crystalline ironborosilicates.

(b) Description of the Prior Art

It has been demonstrated in the past that zeolitic materials, both natural and synthetic, and commonly referred to as molecular sieves, can have catalytic, sorption and separating properties. A number of existing processes such as catalytic cracking, methanol conversion, isomerisation of xylenes, alkylation of aromatics, exemplify the uses of these molecular sieve materials.

Typically represented by aluminosilicates, zeolites are structurally complex crystalline inorganic polymers based on an infinitely extending framework of $AlO_4$ and $SiO_4$ tetrahedra linked to each other by the sharing of oxygen atoms. This framework structure contains large and small cavities interconnected by channels as in the case of Y-type zeolites. These cavities and channels which are generally uniform in size are occupied by cations and water molecules. The cations may be mobile and therefore can undergo ion-exchange. In view of the mobility of the cations, it is believed that zeolitic materials behave like solid electrolytes. The water molecules may be removed reversibly by the application of heat, which in most cases leaves intact a highly porous crystalline structure. As the ratio of silica to alumina increases, the zeolitic material becomes progressively hydrophobic. Zeolites structurally related to ZSM-5 do not possess cavities; they have channel intersections and they are generally hydrophobic.

In terms of composition, zeolites can be regarded as being derived from silica. The substitution of some of the silicon atoms within the crystalline framework of the silica by trivalent aluminium, boron or iron atoms generates an anionic site in the environments of the aluminium atoms so that, in order to preserve electroneutrality, a cation such as that of the alkali or alkaline-earth metals is required. Considering the fact that tetra-coordinated aluminium atoms cannot share the same oxygen atom, it follows that y in the following empirical formula representing a typical zeolite cannot be less than 2:

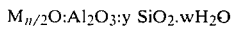

$M_{n/2}O:Al_2O_3:y\ SiO_2.wH_2O$ wherein M is a cation of valence n, y is 2 or greater and w is a value representing the water contained in the intracrystalline channel systems of the zeolite after synthesis or crystallization in nature.

Prior art developments have resulted in the synthesis of more than 150 zeolite types. To date, forty zeolite minerals are known.

Zeolites which belong to the Pentasil family are considered relevant to the present invention. More specifically, this invention relates to crystalline ironborosilicate zeolites which are structurally related to ZSM-5 zeolites.

U.S. Pat. No. 3,702,886 which is here considered relevant discloses the crystalline aluminosilicate ZSM-5 and the process of preparing the same. This patent teaches the preparation of a crystalline alumino or gallosilicate and a crystalline alumino or gallogermanate by reacting silicon oxide or germanium oxide with aluminium oxide or gallium oxide in a range of specific ratios under specified reaction conditions. The product obtained has a specific X-Ray diffraction pattern. This patent is therefore limited to alumino and gallosilicate as well as alumino and gallogermanates. Patents disclosing the synthesis of ZSM-11 and ZSM-12 are likewise limited in scope to crystalline alumino or gallosilicates or germanates which also provide specific X-Ray diffraction patterns.

The production of the ZSM materials makes use of a mixed base system wherein sodium aluminate and a silicon-containing material are allowed to react in the presence of sodium hydroxide and an organic base template such as a tetrapropylammonium hydroxide or bromide under specified reaction conditions to yield the crystalline aluminosilicates.

U.S. Pat. No. 3,328,119 which is considered relevant art, claims and teaches the process of preparing a crystalline aluminoborosilicate wherein the boria forms an integral part of the crystal framework structure of the zeolite material. However, the crystalline structure of the material is not related to the Pentasil family.

Another U.S. Pat. No. 4,269,813 which is considered more relevant to this invention discloses a class of crystalline borosilicates designated as AMS-1B and a process of preparing same. AMS-1B crystalline borosilicates are zeolitic materials which provide an X-Ray diffraction pattern similar to ZSM-5. This patent is limited in scope to borosilicates.

German Offonlegungsschrift No. 2,830,787 relates to crystalline alumino, boro, arseno, and antimony silicates having specified X-Ray diffraction patterns and to processes for preparing the same.

German Offenlegungsschrift No. 2,755,770 discloses the preparation of crystalline iron aluminosilicates and their uses.

Additional relevant prior art comprises U.S. Pat. Nos. 4,029,716 and 4,078,009 which relate to a crystalline aluminosilicate zeolite having a silica to alumina ratio of at least 12 and a constraint index within the range of 1 to 12 and containing boron in an amount of at least 0.2 weight percent as a result of a reaction of the zeolite with a boron-containing compound.

SUMMARY OF THE INVENTION

The present invention, however, relates to a novel family of stable synthetic crystalline iron-borosilicates identified as ZKQ-1B and possessing a specified X-Ray diffraction pattern. It is understood that the iron and boron constitute an inherent part of the crystal framework structure of the material rather than a subsequent modification of the material composition.

The ZKQ-1B crystalline ironborosilicates according to the invention are formed by reacting the products formed as a result of a reaction between an iron-containing material and a boron containing material, such as boric acid, or an alkali tetrahydroborate with a silicon-containing material in a basic medium, which contains an alkali hydroxyde or an alkaline earth hydroxide, an alkylammonium cation or a precursor thereof, optionally a mineralising agent such as sodium chloride and water. Under specified reaction conditions conducive to the formation of ZKQ-1B, the zeolite product is crystallised out from the solution with the iron and boron already contained within the crystal framework prior to physical separation of the product from the mother liquor. It will be understood that any modification of the crystallised ironborosilicate zeolite subsequent to its formation using such techniques as metal impregnation or deposition, cation exchange, is to be clearly distinguished from the process of the present invention.

Broadly speaking, according to the present invention, there is provided a crystalline ironborosilicate product, which comprises molecular sieve material having the following composition in terms of mole ratios of oxides:

$$1.0 \pm 0.3 \, M_{n/2}O:(a \, Fe_2O_3:b \, B_2O_3):y \, SiO_2.z \, H_2O \quad (1)$$

wherein M is selected from the group comprising hydrogen cation, ammonium cation, monovalent and divalent metal cations such as alkali metal cations alkaline-earth metal cations, a catalytically active metal cation and mixtures thereof; n is its valence; a and b are each greater than zero but less than 1 such that $a+b=1$; y is a value of at least 6; z is between zero and about 500.

DESCRIPTION OF PREFERRED EMBODIMENTS

In accordance with a preferred embodiment of the invention such crystalline ironborosilicate provides an X-Ray diffraction pattern which comprises the following diffraction lines as shown in Table I.

TABLE I

| Interplanar spacings, d (Å) | Relative Intensity |
| --- | --- |
| 11.2 ± 0.2 | w-s |
| 10.05 ± 0.2 | w-ms |
| 9.05 ± 0.15 | vw |
| 7.50 ± 0.15 | w |
| 7.13 ± 0.15 | vw |
| 6.71 ± 0.15 | vw |
| 6.40 ± 0.15 | w |
| 6.04 ± 0.1 | w |
| 5.7 ± 0.1 | w |
| 5.60 ± 0.1 | w |
| 5.13 ± 0.1 | vw |
| 5.00 ± 0.1 | w |
| 4.62 ± 0.08 | w |
| 4.26 ± 0.08 | w |
| 4.02 ± 0.08 | w |
| 3.83 ± 0.05 | vs |
| 3.71 ± 0.05 | s |
| 3.65 ± 0.05 | m-s |
| 3.43 ± 0.05 | w |
| 3.33 ± 0.05 | w |
| 3.26 ± 0.05 | vw |
| 3.05 ± 0.05 | w |
| 2.99 ± 0.02 | w |
| 2.86 ± 0.02 | vw |
| 2.78 ± 0.02 | vw |
| 2.73 ± 0.02 | vw |
| 2.61 ± 0.02 | vw |
| 2.49 ± 0.02 | w |
| 2.39 ± 0.02 | vw |
| 2.00 ± 0.02 | w-m |
| 1.95 ± 0.02 | vw |
| 1.91 ± 0.02 | vw |
| 1.87 ± 0.02 | vw |
| 1.76 ± 0.02 | vw |
| 1.66 ± 0.02 | vw |

These data were obtained by standard X-Ray diffraction techniques, using the K-alpha doublet of copper radiation. In Table I the relative intensities are given in terms of the symbols:
vs: very strong
s: strong
ms: medium strong
m: medium
mw: medium weak
w: weak
vw: very weak It will be understood that the above X-Ray diffraction pattern is characteristic of all the species of ZKQ-1B compositions. Minor shifts in interplanar spacings and minor variations in relative intensities may occur as a result of ion-exchange of sodium ions or other alkaline metal ions with other cations and of heat treatment; on the whole, however, the diffraction pattern will substantially be the same.

In another instance, the claimed crystalline ironborosilicate which is not yet activated or calcined at high temperatures can be generally represented in terms of the mole ratios of oxides by equation 2:

$$1.0 \pm 0.3 \, (x \, R_2O + (1-x)M_{n/2}O):(a \, Fe_2O_3:b \, B_2O_3):y \, SiO_2.z \, H_2O \quad (2)$$

wherein R is an alkylammonium cation, M is at least one cation of valence n, a and b are each greater than 0 but less than 1 so that $a+b=1$, y is at least 6 and z is a value between zero and 500, and x is greater than 0 but less than 1.

Table II summarizes the values the $y/(a+b)$ may assume.

TABLE II

| | Broad | Suitable | Preferred | More preferred |
| --- | --- | --- | --- | --- |
| y/(a + b) | 6-500 | 6-300 | 6-160 | 6-130 |

Preferably, z in equation (2) is within the range of zero to about 40.

In the general formulations represented by the above equations, M can be substituted at least in part by other cations using such techniques well known in the art, for example, ion-exchange. These cations are preferably those which render the ZKQ-1B crystalline ironborosilicate zeolites catalytically active especially in the conversion of hydrocarbons. Such cations or mixtures thereof include metals from Groups 1B, 11B, V111, A1, rare earth metals, hydrogen, noble metals and other catalytically active metals known in the art. They can consitute anywhere from about 0.05 to about 25 weight percent of the ZKQ-1B crystalline ironborosilicate.

An X-Ray powder diffraction pattern of ZKQ-1B crystalline ironborosilicate indicating the significant lines are shown in Table III, which gives values that are characteristic of ZKQ-1B crystalline ironborosilicate having the oxide mole formula given in equation (1), which ironborosilicate has been calcined at 538° C. in air for 5 hours.

TABLE III

| Interplanar spacings, d (Å) | Relative Intensity |
| --- | --- |
| 11.1 ± 0.2 | w-s |
| 10.04 ± 0.2 | w-ms |
| 7.56 ± 0.15 | vw |
| 6.71 ± 0.15 | vw-w |
| 6.40 ± 0.15 | vw-w |
| 6.00 ± 0.10 | w |
| 5.71 ± 0.1 | vw-w |
| 5.60 ± 0.1 | w |

TABLE III-continued

| Interplanar spacings, d (Å) | Relative Intensity |
|---|---|
| 5.01 ± 0.1 | w |
| 4.62 ± 0.08 | w |
| 4.36 ± 0.08 | w |
| 4.27 ± 0.08 | w |
| 4.01 ± 0.08 | w |
| 3.858 ± 0.05 | vs |
| 3.74 ± 0.05 | s |
| 3.648 ± 0.05 | m-s |
| 3.45 ± 0.05 | w |
| 3.32 ± 0.05 | w |
| 3.255 ± 0.05 | vw |
| 3.054 ± 0.05 | w |
| 2.985 ± 0.02 | w |
| 2.867 ± 0.02 | vw |
| 2.734 ± 0.02 | vw |
| 2.490 ± 0.02 | vw |
| 2.396 ± 0.02 | vw |
| 2.010 ± 0.02 | w-mw |
| 1.998 ± 0.02 | w-mw |
| 1.954 ± 0.02 | vw |
| 1.918 ± 0.02 | vw |
| 1.873 ± 0.02 | vw |
| 1.760 ± 0.02 | vw |
| 1.668 ± 0.02 | vw |

In table IV is presented the X-Ray diffraction pattern of a ZKQ-1B crystalline ironborosilicate, represented by equation (2), which has been dried at 160° C. after having been separated from the mother liquor by filtration and washed copiously with water. This pattern shows the following significant lines:

TABLE IV

| Interplanar spacings d (Å) | | Relative intensity |
|---|---|---|
| 11.1 ± 0.2 | | mw-s |
| 10.0 ± 0.2 | | mw-s |
| 9.0 ± 0.15 | | vw |
| 7.45 ± 0.15 | | w |
| 7.13 ± 0.15 | | vw |
| 6.71 ± 0.15 | | vw |
| 6.40 ± 0.15 | | w |
| 6.04 ± 0.15 | | w |
| 5.63 ± 0.1 | | w |
| 5.52 ± 0.1 | | w |
| 5.13 ± 0.1 | | vw |
| 5.00 ± 0.1 | | w |
| 4.62 ± 0.08 | | w |
| 4.36 ± 0.08 | | w |
| 4.26 ± 0.08 | | w |
| 4.00 ± 0.08 | | w |
| 3.83 ± 0.05 | | vs |
| 3.70 ± 0.05 | | s |
| 3.63 ± 0.05 | | m-s |
| 3.42 ± 0.05 | | w-mw |
| 3.32 ± 0.05 | | w-mw |
| 3.24 ± 0.05 | | vw |
| 3.05 ± 0.05 | | w-mw |
| 2.98 ± 0.02 | | w-mw |
| 2.84 ± 0.02 | | vw |
| 2.77 ± 0.02 | | vw |
| 2.72 ± 0.02 | | vw |
| 2.59 ± 0.02 | | vw-w |
| 2.47 ± 0.02 | | vw-w |
| 2.38 ± 0.02 | | vw |
| 2.00 ± 0.02 | (doubled) | w-mw |
| 1.95 ± 0.02 | | vw |
| 1.90 ± 0.02 | | vw |
| 1.86 ± 0.02 | | vw |
| 1.76 ± 0.02 | | vw |
| 1.65 ± 0.02 | | vw |

A typical X-Ray diffraction pattern comprising the diffraction lines and assigned intensities is shown in Table V for a crystalline ironborosilicate zeolite, which has been exchanged twice with ammonium ions, copiously washed with deionised water and calcined at 538° C. for 10 hours.

TABLE V

| Interplanar spacings d (Å) | Relative Intensity |
|---|---|
| 11.2 ± 0.2 | w-s |
| 10.07 ± 0.2 | w-ms |
| 7.49 ± 0.15 | vw |
| 6.71 ± 0.15 | vw-w |
| 6.39 ± 0.15 | w |
| 5.99 ± 0.10 | w |
| 5.71 ± 0.10 | vw-w |
| 5.59 ± 0.10 | w |
| 5.00 ± 0.10 | w |
| 4.62 ± 0.08 | w |
| 4.36 ± 0.08 | w |
| 4.27 ± 0.08 | w |
| 4.00 ± 0.08 | w |
| 3.85 ± 0.05 | vs |
| 3.73 ± 0.05 | s |
| 3.65 ± 0.05 | m-s |
| 3.45 ± 0.05 | w |
| 3.31 ± 0.05 | w |
| 3.055 ± 0.05 | w |
| 2.99 ± 0.02 | w |
| 2.875 ± 0.02 | vw |
| 2.74 ± 0.02 | vw |
| 2.61 ± 0.02 | vw |
| 2.49 ± 0.02 | vw |
| 2.40 ± 0.02 | vw |
| 2.012 ± 0.02 | w-mw |
| 1.998 ± 0.02 | w-mw |
| 1.953 ± 0.02 | vw |
| 1.918 ± 0.02 | vw |
| 1.766 ± 0.02 | vw |
| 1.670 ± 0.02 | vw |

The ZKQ-1B crystalline ironborosilicate is prepared by the method which comprises:

(1) preparing a mixture consisting either of the integral reaction products between an iron-containing compound and an alkali tetrahydroborate, or of an iron-containing compound and a boron-containing compound, together with a source of silicon, an alkylammonium cation, a mineralization agent such as sodium chloride and water and a source of hydroxyl ions. Examples of sources of silicon are Ludox TM, Nalcoag 1030 TM and waterglass such as Brand "0";

(2) maintaining said mixture under suitable reaction conditions to effect formation of said ironborosilicate, said reaction conditions including a reaction temperature between 25° C. to about 300° C., a pressure of at least the vapour pressure of water at said temperature and a reaction time sufficient to effect crystallisation of said ironborosilicate.

Examples of alkali tetrahydroborates are sodium tetrahydroborate, potassium tetrahydroborate and lithium tetrahydroborate. Examples of alkylammonium cations are: tetrapropylammonium bromide, tetrapropylammonium hydroxide, and precursors of said cations such as an alkylamine, an alkylamine plus an alkyl halide. For instance, by reacting tri-n-propylamine and n-bromopropane under suitable conditions, tetrapropylammonium bromide is formed. Hexamethylene diamine is an example of an alkylamine which may be used.

The mixture used in the method of preparation of ZKQ-1B crystalline ironborosilicate can be further characterised in terms of mole ratios of oxides in the ranges presented in Table VI.

TABLE VI

| | BROAD | PREFERRED | MOST PREFERRED |
|---|---|---|---|
| $SiO_2/B_2O_3$ | 6–500 | 6–300 | 6–200 |

TABLE VI-continued

| | BROAD | PREFERRED | MOST PREFERRED |
|---|---|---|---|
| $SiO_2/Fe_2O_3$ | 6–500 | 6–300 | 6–150 |
| $OH^-/SiO_2$ | 0.01–11 | 0.1–2 | 0.1–1 |
| $R_2O/(R_2O + M_{n/2}O)$ | 0.1–1 | 0.2–0.97 | 0.3–0.97 |
| $H_2O/OH^-$ | 10–4000 | 10–500 | 10–500 | wherein R is an alkylamine or alkylammonium cation, preferably tetra-n-propylammonium cation, M is at least one cation of valence n such as an alkali metal or an alkaline-earth metal cation.

When an alkali metal hydroxide is used in the preparation to provide a source of alkali metal ions for electrovalent neutrality and to control the pH of the reaction mixture, the values of the ratio of $OH^-/SiO_2$ in Table VI should be such as to render the pH of the system broadly within the range of about 9 to about 13.5. An alkaline pH within that range favours the formation of ZKQ-1B crystalline ironborosilicate. The pH of the system falling within the range of about 9 to 12 is to be preferred as it favours the incorporation of iron and boron in the framework structure of the molecular sieve. Each ingredient is added in an amount calculated to give the desired molar composition in the resulting mixture. For example, by regulating the amount of boron (represented by $B_2O_3$) and iron (represented by $Fe_2O_3$) in the reaction mixture, the $SiO_2/B_2O_3$ and $SiO_2/Fe_2O_3$ molar ratios in the final product can be varied within the ranges shown in Table VI. In view of the fact that commercially available materials utilised in the preparation of the ironborosilicate do contain very minor amounts of aluminium as an impurity, the $SiO_2:Al_2O_3$ ratio in the synthesised ironborosilicates can be anywhere from 1500 and up.

Reaction conditions conducive to the formation of crystalline ironborosilicates include heating the reaction mixture from about 25° C. to 300° C. for a period running from less than 24 hours to 4 weeks under autogeneous pressure. Especially preferred reaction conditions include a temperature around 165° C. and a crystallisation time of about a week. It is generally considered that the formation of zeolites requires low temperature hydrothermal conditions with concurrent low autogeneous pressure at saturated water vapour pressure and a high degree of supersaturation of the gel components, thereby leading to the nucleation of a large number of crystals. Generally the presence of a relatively high amount of sodium chloride promotes the mineralisation of zeolites.

Calcination of crystalline ironborosilicate previously washed free of soluble salts is carried out in air at temperatures anywhere from 260° C. to 590° C. Although said crystalline ironborosilicate is thermally highly stable, it is advisable not to calcine it at extreme temperatures because of the risk of modifying its structure or causing total collapse of its structure. Preferably, the calcination temperature required to remove the alkylammonium cation from the "as synthesised" crystalline ironborosilicate need not exceed 540° C.

Generally, the hydrogen form of ZKQ-1B is prepared by repeated treatment with an aqueous solution of ammonium chloride at 100° C. under autogeneous pressure for a period anywhere from 1 hour to 24 hours. Ammonium nitrate and ammonium acetate can also be used in ammonium exchange. After being washed free of soluble salts with water, dried at 110° C., and then calcined at 538° C. for a period anywhere from 3 hours to 15 hours, the ammonium form of ZKQ-1B crystalline ironborosilicate is converted into the hydrogen form which is particularly favoured in the respective catalytic conversion of methanol and syngas into high-octane liquid hydrocarbons.

The crystalline ironborosilicate can be modified for certain applications in hydrocarbon conversions by impregnation or ion-exchange techniques well known in the art. It may suitably be compounded with certain inorganic materials which include active and inactive materials for organic conversion processes. Examples of inorganic materials are clays, silica, alumina, silica-alumina, silica-zirconia, silica-magnesia, etc. The matrix can be in the form of a hydrogel or cogel which subsequently provides a porous matrix material. The final composite may contain between 20 to 85 weight percent of crystalline ZKQ-1B ironborosilicate.

CONVERSION OF SIMPLE ALCOHOLS INTO HIGH-OCTANE GASOLINE

The conversion of methanol into high-octane gasoline by contacting said alcohol with HZSM-5 catalyst is described in U.S. Pat. No. 3,911,041. This process is considered relevant art. U.S. Pat. No. 4,292,458 which is also considered relevant to the present invention discloses the use of a crystalline borosilicate zeolite in the conversion of methanol into synthetic high-octane gasoline.

It has been discovered that the acid form of crystalline ZKQ-1B ironborosilicate is active in the conversion of methanol and ethanol respectively into high-octane gasoline.

There is provided a process for the conversion of simple alcohols such as methanol or ethanol selectively into highly aromatic gasoline, which process involves contacting said feedstock or its products of dehydration with the hydrogen form of ZKQ-1B crystalline ironborosilicate.

Use of ZKQ-1B crystalline ironborosilicate zeolite in the conversion of syngas into high-octane gasoline.

The Fisher-Tropsch synthesis which generally suffers from lack of selectivity produces a wide spectrum of hydrocarbons and oxygen-containing products including low-octane gasoline. Extensive and costly facilities are thus needed to separate and upgrade the products. Several approaches are being pursued in the development of highly selective catalysts for synthetic gas conversion. One of these approaches which seems to reflect current thinking regarding the mechanism of the reactions is based on the interception of intermediates formed during the Fisher-Tropsch synthesis on iron catalyst. In this approach, primary low-molecular-weight intermediates derived from $CO-H_2$ synthesis reaction are intercepted before the normal Fisher-Tropsch polymerisation process occurs. This is effected in situ by introducing a second catalyst function which promotes the formation of higher molecular-weight products by way of a different mechanism. This second function is provided by the active Bronsted or Lewis sites within the intracrystalline cavities, if any, and pores or channel system of zeolites. Zeolites possessing shape-selective properties are ideally suited for this purpose. U.S. Pat. No. 4,172,843 which is considered relevant to the present invention discloses th use of an intimate mixture of an iron-containing Fisher-Tropsch component and a volume excess of an acidic aluminosilicate crystalline zeolite in the direct conversion of syngas to high-octane predominantly olefinic naphtha.

In U.S. Pat. No. 4,086,262 there is provided a single stage process for the conversion of synthesis gas into gasoline wherein the catalyst is an intimate mixture of an iron-containing F-T catalyst and a ZSM-5 type catalyst. This patent is considered relevant art.

In Europeant Patent Application No. 8030773.0, there is disclosed a process for converting syngas into either gasoline or higher-boiling distillate material wherein the catalyst in the first stage reactor is an iron-containing F-T catalyst and, in the second stage reactor there is a crystalline aluminosilicate zeolite.

U.S. Pat. No. 4,046,830 discloses a method for upgrading Fisher-Tropsch synthesis products over a ZSM-5 type zeolite.

European Patent Application No. 79302666.7 discloses a method for preparing a synthesis gas conversion composite catalyst consisting of iron or iron oxide, a hydrogel matrix and an acidic crystalline aluminosilicate zeolite, preferably a ZSM-5 type zeolite.

From the foregoing, it will be appreciated that, for the production of high-octane gasoline or olefinic naphtha directly from syngas, the conversion catalytic system employed has been based on the use of iron catalysts physically admixed with a relatively large proportion of crystalline zeolite such as ZSM-5. In this type of configuration the crystalline zeolite intercepts and scavenges the olefin intermediate products and effects synthesis of high-octane aromatic gasoline or olefinic naphtha.

Contrary to the above-mentioned catalytic system, the syngas conversion catalyst of the present invention is a single particle catalyst wherein the iron component is not only not physically admixed with the zeolite component but it forms part and parcel of the crystalline structure of the zeolite, said zeolite material being an ironborosilicate crystalline zeolite in the acidic form.

The present invention, then, concerns the use of an ironborosilicate crystalline zeolite as a syngas conversion catalyst for the production of high-octane liquid hydrocarbons. In the formulation of such a syngas conversion catalyst, no iron either in metallic or oxide form is added and physically admixed with the crystalline ironborosilicate zeolite. The said crystalline ironborosilicate zeolite may be composite with siliceous materials such as silica, alumina, silica-alumina, silica-zirconia, etc.

Prior to its use for the conversion of syngas, the crystalline ironborosilicate zeolite previously exchanged with ammonium ions, washed free of soluble salts, and calcined at 538° C., is treated with syngas at temperatures of about 290° C. to 340° C. for periods of time ranging from 3 hours to about 24 hours.

The conversion of syngas to high-octane gasoline using the pretreated catalyst is conveniently carried out at a temperature of 250° C. to 315° C. and a pressure of 446 kPa to 6996.1 kPa. The product gasoline has a boiling range of less than 204° C. at a 90% overhead. The conversion syngas catalyst produces a highly olefinic, branched and aromatic product spectrum mostly concentrated in the region below $C_{11}$.

The process of this invention is preferably carried out at temperatures ranging from 275° C. to about 305° C.; at gas hourly space velocities ranging from 400 to 6000, based on fresh feed and total catalyst volume; at hydrogen to carbon oxide ratios from 0.5:1 to 2:1 and more desirably about 1:1, and pressures ranging from 446 kPa to 6996.1 kPa and more preferably from 1135.6 kPa to 2859.2 kPa.

The present invention will be further understood by the following examples, which are given for illustrative purposes only and are thus not intended to limit the scope of the invention.

EXAMPLE 1

12.7 g. of ferric ammonium sulfate, $FeNH_4(SO_4)_2 \cdot 12H_2O$ were dissolved in 100 ml of deionised water (Solution 1). 1.52 g of sodium tetrahydroborate were dissolved in 80 ml of deionised water (Solution 2). A solution (Solution 3) containing 10.64 g of sodium hydroxide, 40 g of sodium chloride and 47.5 g of tetrapropylammonium bromide was prepared in 250 ml of deionised water.

Solution 2 was slowly added to Solution 1 with stirring in a Waring blender whereupon a voluminous black precipitate was formed with simultaneous liberation of hydrogen. Solution 3 was then added to the resulting reaction products with vigorous stirring in order to fully disperse the precipitate. This was then followed by the quick addition of 200 g of Nalcoag1030 TM (30% colloidal $SiO_2$) whereupon a gel was instantaneously formed into which the black precipitates was dispersed. The vigorous stirring was maintained for a few minutes to ensure complete homogenization. The gel whose pH was 11.15 was transferred into a Teflon TM -lined autoclave (Teflon stands for polytetrafluoroethylene) and allowed to age for a few hours at room temperature. The autoclave was sealed and placed in an oven. The temperature was raised to 165° C. and held at this value for a period of 6 to 7 days. The pH of the mother liquor was 11.3. The solid product obtained was filtered and washed copiously with deionised water in order to remove soluble salts. A portion of it was dried at about 160° C. in air and subjected to X-Ray analysis. Its X-Ray diffraction pattern comprising the diffraction lines is presented in Table I.

Another portion of the washed solid product was calcined at 538° C. in air for 5 hours. The X-Ray diffraction lines provided by the calcined product are shown in Table III.

Chemical analysis of the calcined sample in the sodium hydrogen form gave the following results:

| | |
|---|---|
| Weight percent $SiO_2$ | 93.8 |
| Weight percent $Fe_2O_3$ | 2.85 |
| Weight percent $B_2O_3$ | 0.70 |
| Weight percent $Na_2O$ | 1.30 |
| Weight percent volatiles | 1.35 |
| Total | 100.00 |
| $SiO_2:B_2O_3$ | 48.2 |
| $SiO_2:Fe_2O_3$ | 87.5 |
| $SiO_2:(Fe_2O_3 + B_2O_3)$ | 31.0 |
| $Na_2O:(Fe_2O_3 + B_2O_3)$ | 0.42 |

EXAMPLE 2

The process of Example I was repeated, using different quantities of starting materials.
A. Solution 1 contained 6.35 g of ferric ammonium sulfate dissolved in 100 ml of deionised water.
B. Solution 2 contained 2.65 g of sodium tetrahydroborate dissolved in 75 g of deionised water.
C. Solution 3 contained 7.97 sodium hydroxide, 40 g of sodium chloride and 47.5 g of tetrapropylammonium bromide dissolved in 250 ml of deionised water.

D. 130 g of Nalcoag1030 ™ was used.

The pH of the gel was 12.4. The product obtained was well crystallised and provided a X-Ray diffraction pattern similar to that shown in Table I.

EXAMPLE 3

A. Solution 1 contained 20 g of ferric ammonium sulfate dissolved in 125 ml of deionised water.
B. Solution 2 contained 2.5 g of sodium tetraborate dissolved in 80 ml of deionized water.
C. Solution 3 was made up by dissolving 10.64 g of sodium hydroxide, 40 g of sodium chloride and 47.5 g of tetrapropylammonium bromide in 250 ml of deionised water.
D. 200 g of Nalcoag1030 ™ were used as a source of silica. The pH of the gel was 10.1. The X-Ray diffraction pattern of the crystalline product was similar to that shown in Table I.

EXAMPLE 4

A. Solution 1 was made up by dissolving 38.1 g of ferric ammonium sulfate in 150 ml of deionised water.
B. Solution 2 was made up by dissolving 4.5 g of sodium tetrahydroborate in 80 ml of deionised water.
C. Solution 3 was prepared by dissolving 16.6 g of NaOH, 49 g NaCl and 47.5 g of tetrapropylammonium bromide in 275 ml of deionised water.
D. 200 g of Nalcoag1030 ™ was used as the source of silica.

The pH of the gel was 10.47. The X-Ray diffraction pattern of the crystalline product was similar in all respects to that presented in Table I.

EXAMPLE 5

A. Solution I was prepared by dissolving 304.8 g of ferric ammonium sulfate in 1200 ml of hot deionised water.
B. Solution 2 was made up by dissolving 37 g of sodium tetrahydroborate in 200 ml of deionised water.
C. Solution 3 was prepared by dissolving 380 g of TPABr (tetrapropyl ammonium bromide), 96 g of NaOH and 320 g of NaCl in 1000 ml of deionised water.
D. 1550 g of Nalcoag1030 ™ were used as the source of silica and the liquid was diluted with 1480 ml of deionised water and thoroughly mixed before use.

The pH of the gel was 9.6. The X-Ray diffraction pattern was similar in all respects to that obtained from the product of Example I.

EXAMPLE 6

A solution (1) containing 3.0 g of boric acid, 8.5 g of sodium hydroxide, 94.5 g tetrapropylammonium bromide, and 500 ml of deionised water was prepared. Another solution (2) was prepared by dissolving 10 g of ferric ammonium sulfate and 40 g of sodium chloride in 200 ml of deionised water. Solutions (1) and (2) were added simultaneously to 150 g of Nalcoag1030 ™ with vigorous stirring. After allowing the gel to age for a few hours it was transferred to an autoclave. The sealed autoclave was heated at 165° C. for seven days. The crystalline product was separated from the mother liquor by filtration and washed copiously with deionised water. The crystalline product provided an X-Ray diffraction pattern similar to that obtained with the product of Example I.

EXAMPLE 7

A portion of each of the products obtained from Examples 1 to 5 was copiously washed with deionised water to remove soluble salts. Washing was considered sufficient when the filtrate gave negative results with the silver nitrate and barium chloride tests. The sample was then calcined in air at 375° C. for 15 hours in order to remove the tetrapropylammonium ion and to render more labile the sodium ions within the sample. The calcined sample was then exchanged with an aqueous solution of 5M ammonium chloride at 100° C. for 15 hours, using 15 ml of the solution for each gram of sample treated. A second exchange was performed using fresh solution of ammonium chloride for 5 hours. The ammonium-exchanged sample was then filtered and repeatedly washed with deionised water to ensure complete removal of soluble salts. Conversion to the hydrogen form was effected by final calcination of the sample at 538° C. for 10 hours, using a programmed heating ramp rate of 3° C. per minute. A typical X-Ray diffraction pattern showing all the diffraction lines with their corresponding relative intensities is shown in Table V. The hydrogen form of the five samples is herein designated as HZKQ-1B1, HZKQ-1B2, HZKQ-1B3, HZKQ-1B4, and HZKQ-1B5, respectively. These samples are particularly active in the catalytic conversion of simple alcohols and syngas in high-octane gasoline.

EXAMPLE 8

(Gasoline from methanol)

A dual stage reactor system comprising among other things an essentially adiabatic dehydration reactor coupled in series with an essentially adiabatic conversion reactor was used.

The dehydration reactor was loaded with gamma-alumina. The conversion reactor was loaded with 12 g of HZKQ-1B1 crystalline ironborosilicate zeolite catalyst. Prior to start-up, the inlet and outlet temperature of the dehydration reactor and the conversion reactor were lined out at 315° C. and 371° C. and at 371° C. and 400° C., respectively. Methanol was then pumped at a weight hourly space velocity of 1 and vapourised by means of a pre-heater. The methanol vapour was partially dehydrated over the gamma-alumina to yield a equilibrium mixture of methanol and dimethyl ether, which mixture was converted into high-octane gasoline and water. The pressure of the process was maintained at 892 kPa. Small quantity of non-condensable light $C_1$-$C_4$ hydrocarbons was produced. Analysis of the liquid organic product showed that it was similar to all intents and purposes to premium gasoline. The results are shown in Table VII.

TABLE VII

| | |
|---|---|
| Dehydration reactor, Inlet temperature, °C. = | 343 |
| Dehydration reactor, Outlet temperature, °C. = | 371 |
| Conversion reactor, Inlet temperature, °C. = | 371 |
| Conversion reactor, Outlet temperature, °C. = | 399 |
| WHSV (methanol over catalyst) = | 1.0 |
| Pressure, kPa = | 2075 |
| Product, wt % of charge | |
| Hydrocarbons | 35.1 |
| $H_2O$ | 64.5 |
| $H_2$ | 0.01 |
| CO | 0.10 |
| $CO_2$ | 0.30 |
| Wt % of hydrocarbons | |
| $C_5^-$ liquid hydrocarbons | 75.0 |

TABLE VII-continued

| | |
|---|---|
| Aromatics, wt % of $C_5{}^+$ liquid hydrocarbons | 26.0 |

EXAMPLE 9

(High-octane gasoline from synthesis gas)

A fixed-bed catalyst operation was employed. 2 g of HZKO-1B3 mixed with ground quartz, in ratio 1:1 were placed in the tubular reactor. Prior to syngas gas conversion, the catalyst was pretreated with syngas having an $H_2$:CO ratio of 1 at 325° C. and 101 kPa and at a flowrate of 100 ml per minute for 15 hours.

The one-stage syngas conversion was conducted in a downflow manner at 1447 kPa using a synthesis gas with an $H_2$:CO ratio of 1. The operating temperature was 300° C. and the space velocity was 450. The weight % carbon converted to hydrocarbons was 60.9 and methane in hydrocarbon product was 11.2 weight percent. Chromatographic analysis of the $C_5+$ product showed it to be highly olefinic and aromatic in nature. Furthermore the product spectrum is mostly concentrated in the region below $C_{11}$. Comparison of the product's chromatogram with that of a premium grade gasoline showed at least qualitatively a striking similarity between the two. The results appear in Table VIII.

EXAMPLE 10

The process of Example 9 was repeated with HZKQ-1B4 The results obtained are presented in Table VIII. The weight percent of methane in the effluent was 10.4, which is relatively low.

EXAMPLE 11

In this example the synthesis was carried out in a Continuous Stirred-Tank Reactor (CSTR) of the Berty-Carberry type.

200 ml (138.91 g) of HZKQ-1B5 were loaded into the reactor. Pretreatment of the catalyst was conducted at 325° C. for about 16 hours at 8 p.s.i. with synthesis gas having an $H_2$:CO ratio of 1.13 and at a space velocity of 600.

Synthesis was conducted using a syngas with an $H_2$:CO ratio of 1.13. The operating pressure and temperature were 1447 kPa and 300° C., respectively. The space velocity was 600.

The weight percent of methane in total effluent was was only 12.4. The results are present in Table VIII.

TABLE VIII

Syngas conversion at 1447 kPa

| | Example 9 | Example 10 | Example 11 |
|---|---|---|---|
| $H_2$:CO Feed ratio | 1.0 | 1.0 | 1.18 |
| Temperature, °C. | 300 | 300 | 300 |
| Space velocity ($h^{-1}$) | 450 | 600 | 600 |
| Conversion Wt. percent | | | |
| CO | 70.2 | 61.1 | 60.84 |
| $H_2$ | 47.7 | 54.2 | 37.82 |
| Weight % carbon converted to hydrocarbons | 60.9 | 63.8 | 58.7 |
| Total Effluent, Wt. percent | | | |
| Hydrocarbons | 23.8 | 23.8 | 24.59 |
| $H_2$ | 3.9 | 3.6 | 4.04 |
| CO | 22.5 | 26.8 | 26.19 |
| $CO_2$ | 29.8 | 27.4 | 27.1 |
| $H_2O$ | 20.0 | 18.4 | 18.04 |
| Hydrocarbon wt. percent | | | |
| $C_1 + C_2$ | 17.5 | 19.1 | 19.26 |
| $C_3 + C_4$ | 13.3 | 15.1 | 15.29 |
| $C_5{}^+$ | 69.2 | 65.8 | 65.4 |
| Aromatics in $C_5{}^+$, wt. percent | 25.7 | 19.5 | 18.0 |
| Liquid Product 90% Point, °C. | 197 | 198 | 195 |

I claim:

1. The method of preparing a crystalline ironborosilicate zeolitic material having a composition in terms of mole ratios of oxides as follows:

$$1.0 \pm 0.3 M_{n/2}O:(a\ Fe_2O_3:b\ B_2O_3):y\ SiO_2:z\ H_2O$$

wherein M is at least one cation of valence n selected from the group consisting of alkylammonium cation, hydrogen cation, a metal cation and mixtures thereof; a is equal to or greater than 0.05 and b is equal to or greater than 0.05 such that $a+b=1$; y has a value between 6 and 500 and z has a value between zero and 50, said material providing an X-Ray diffraction pattern comprising the following diffraction lines and assigned strengths

| Interplanar spacings, d (Å) | Relative Intensity |
|---|---|
| 11.2 ± 0.2 | w–s |
| 10.05 ± 0.2 | w–ms |
| 9.05 ± 0.15 | vw |
| 7.50 ± 0.15 | w |
| 7.13 ± 0.15 | vw |
| 6.71 ± 0.15 | vw |
| 6.40 ± 0.15 | w |
| 6.04 ± 0.1 | w |
| 5.7 ± 0.1 | w |
| 5.60 ± 0.1 | w |
| 5.13 ± 0.1 | vw |
| 5.00 ± 0.1 | w |
| 4.62 ± 0.08 | w |
| 4.26 ± 0.08 | w |
| 4.02 ± 0.08 | w |
| 3.83 ± 0.05 | vs |
| 3.71 ± 0.05 | s |
| 3.65 ± 0.05 | m–s |
| 3.43 ± 0.05 | w |
| 3.33 ± 0.05 | w |
| 3.26 ± 0.05 | vw |
| 3.05 ± 0.05 | w |
| 2.99 ± 0.02 | w |
| 2.86 ± 0.02 | vw |
| 2.78 ± 0.02 | vw |
| 2.73 ± 0.02 | vw |
| 2.61 ± 0.02 | vw |
| 2.49 ± 0.02 | w |
| 2.39 ± 0.02 | vw |
| 2.00 ± 0.02 | w–m |
| 1.95 ± 0.02 | vw |
| 1.91 ± 0.02 | vw |
| 1.87 ± 0.02 | vw |
| 1.76 ± 0.02 | vw |
| 1.66 ± 0.02 | vw | which comprises reacting together in aqueous solution an iron salt, alkali metal tetrahydroborate, a silicon-containing material, an alkali or alkaline earth metal hydroxide, an alkyl-ammonium cation or precursor thereof and sodium chloride as a mineralization agent, the reaction mixture being maintained at alkaline pH of about 9 to 13.5 and at a temperature between 25° C. and 300° C. for a time sufficient to effect crystallization of the iron-borosilicate under autogenous pressure at the reaction temperature.

2. The method of claim 1 wherein the reaction temperature is about 90° C. to about 250° C.

3. The method of claim 2 wherein the reaction time is about 8 hours to about 7 days.

4. The method of claim 2 wherein said reaction mixture has a composition, in terms of mole ratio of oxides, falling within the following range:

$$SiO_2/(B_2O_3+Fe_2O_3) = 5\text{-}500$$

$$R_2O/R_2O + M_{n/2}O = 0.2\text{-}0.97$$

$$OH^-/SiO_2 = 0.01\text{-}11$$

$$H_2O/OH^- = 10\text{-}4000$$

wherein R is an alkylammonium cation, M is an alkali metal or an alkaline earth metal and n is the valence of M.

* * * * *